United States Patent [19]
Tumback

[11] 3,750,300
[45] Aug. 7, 1973

[54] NORTH-SEEKING GYRO PENDULUM

[75] Inventor: Hans Tumback, Uberlingen/Bodensee, Germany

[73] Assignee: Bodenseewerk Geratetechnik GmbH, Uberlingen/Bodensee, Germany

[22] Filed: Feb. 24, 1971

[21] Appl. No.: 118,538

[30] Foreign Application Priority Data
Feb. 25, 1970 Germany.................. P 20 08 702.9

[52] U.S. Cl.............................. 33/324, 33/275 G
[51] Int. Cl............................................. G01c 19/38
[58] Field of Search................... 33/226 R, 226 A, 33/72 G, 324, 325; 74/5.4, 5.5

[56] References Cited
UNITED STATES PATENTS

| | | | |
|---|---|---|---|
| 2,110,766 | 3/1938 | Harding | 33/226 R |
| 2,802,279 | 8/1957 | Agins | 33/226 R |
| 2,970,382 | 2/1961 | Notomi | 33/226 R |
| 3,229,376 | 1/1966 | Wilcox | 33/226 R |
| 3,231,984 | 2/1966 | Howe et al. | 33/226 R |

*Primary Examiner*—Robert B. Hull
*Attorney*—Darbo, Robertson & Vandenburgh

[57] ABSTRACT

A gyro rotor case is suspended from a frame by a tape. Below the gyro case is a torque motor connected to the frame and gyro case. A pickoff produces an electrical signal which is a measure of the azimuthal deviation of the gyro case from the tortionally unstressed position of the tape and is used to control the torque motor. The current at the torque motor is used to produce an electrical signal which controls a servomotor through a servoamplifier. The servomotor adjusts an instrument for indicating north by rotational movement. The extent of the rotational movement produces an electrical signal which is fed back to the servomotor through the servoamplifier.

7 Claims, 5 Drawing Figures

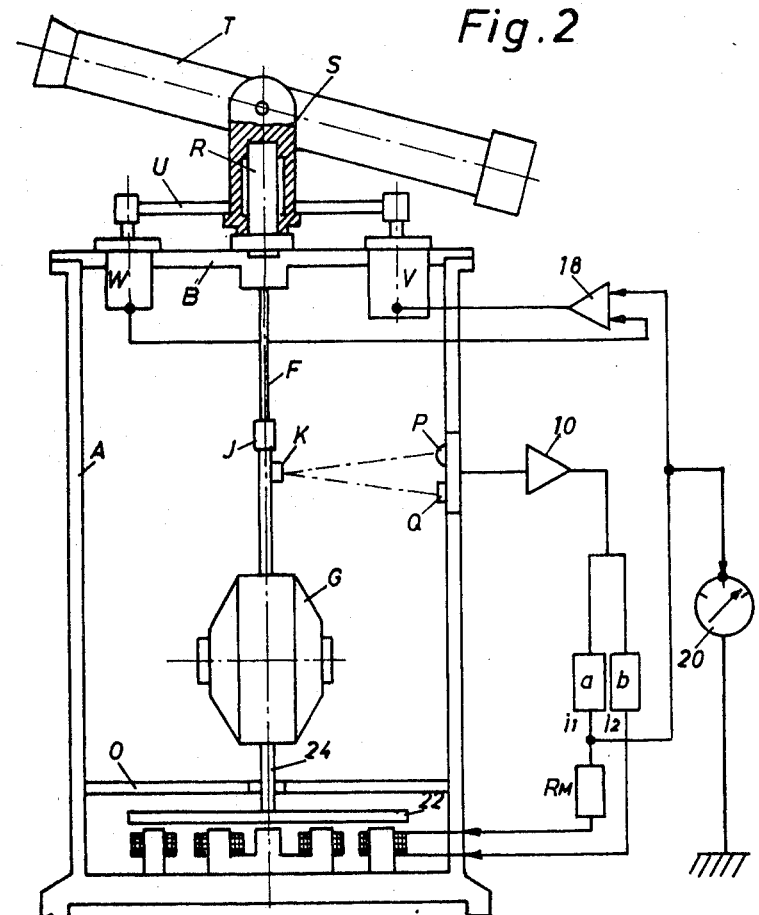
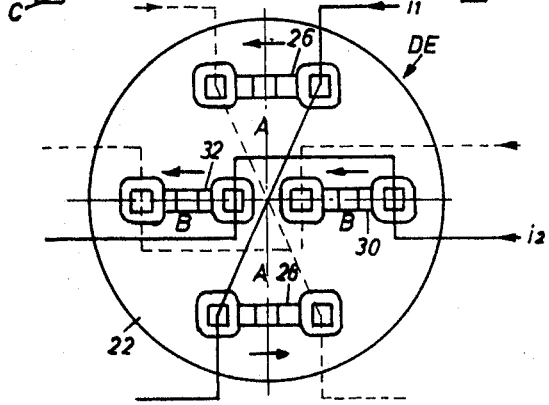
Fig. 2
Fig. 3

NORTH-SEEKING GYRO PENDULUM

BACKGROUND AND SUMMARY OF THE INVENTION

A copending application, Ser. No. 117,813, relates to a north-seeking gyro pendulum including a tape-suspended gyro rotor case. According to that application, a north-seeking gyro pendulum of the type indicated comprises a pickoff for generating a signal in response to the azimuthal deflection of the gyro case relative to the housing from the tape zero position (i.e. the position at which the tape is not torsionally stressed), a torque motor counteracting the gyro directional torque and being controlled by the pickoff signal through an amplifier, and an indicating device likewise controlled by the pickoff signal for indicating north. According to the illustrative embodiment of that application, a zero balancing is effected in that the tape suspension anchor is adapted to be rotated in azimuth by a servomotor and the servomotor is controlled by the pickoff signal. Thus, an automatic rotation of the gyro pendulum towards north is effected. In that application, it has already been proposed to determine the angle between tape zero position and north by measuring the current in the torque motor.

It is an object of the present invention, in an arrangement of the last-mentioned type which has the advantage that the gyro need not be rotated to follow the gyro rotor case and therefore north can be determined more quickly, to nevertheless provide a direct indication of north. According to the invention, this object is achieved in that an indicating member for indicating north is adapted to be rotated by the pickoff signal through a servoamplifier and a servomotor, and a feedback signal is applied to the input of the serroamplifier by a position signaler rotatable with the indicating member. The indicating member may, for instance, be a telescope.

By suitable dimensioning it can be attained that the indicating member moves towards north, while it is not necessary for the gyro to move towards north. The compensation of the gyro directional torque by the torque motor, as will be shown below, automatically provides for the current in the torque motor to be indicative of the deviation between tape zero position and north, while on the other hand a rotation of the indicating member through an angle proportional to the pickoff signal is effected by the position feedback.

Moreover, an indicating instrument for indicating the pickoff signal may be provided. This indicating instrument, though not indicating north, directly indicates the deviation of the tape zero position from north.

The gyro directional torque depends on the latitude, and consequently the indication and orientation, respectively, of the indicating member would also be dependent on the latitude. If the gyro pendulum is used at substantially different latitudes, provision must be made to allow for this influence of the latitude. This may be accomplished in various ways.

One possibility resides in the fact that the position signaler is a potentiometer whose supply voltage is adjustable proportionally to the reciprocal of the cosine of the latitude. In such an arrangement, the latitude is provided in the feedback branch of the servo loop rotating the indicating member towards north.

Another possibility resides in the fact that the voltage drop in the torque motor is supplied to the servoamplifier through a potentiometer adjustable in response to the cosine of the latitude. When using an indicating instrument, this voltage may also be supplied to the indicating instrument through a similar potentiometer. In the latter case, the pickoff of one single potentiometer adjustable in response to the cosine of the latitude may be connected both with the indicating instrument and with the servoamplifier.

DESCRIPTION OF THE DRAWINGS

FIG. 2 is a similar illustration of an apparatus operating with alternating current.

FIG. 3 is a top view of the torque motor in the embodiment of FIG. 2.

DESCRIPTION OF SPECIFIC EMBODIMENTS

Figure 1:
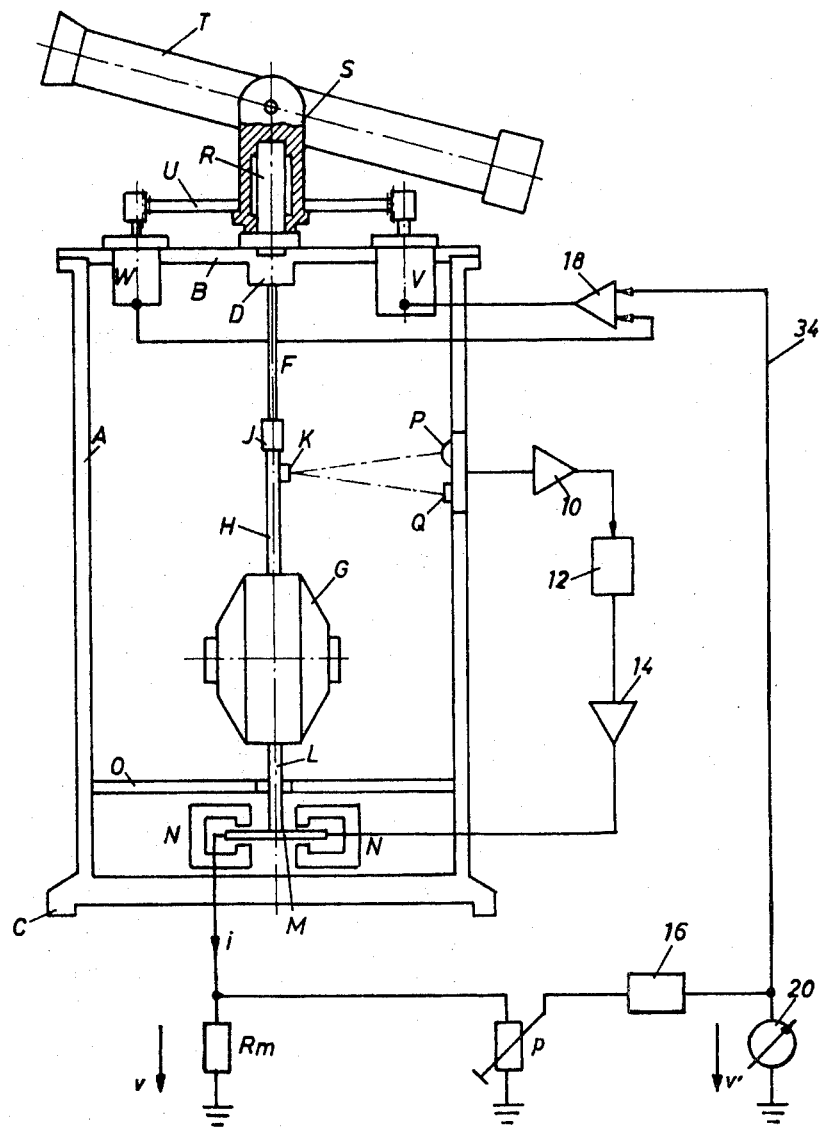
FIG. 1 illustrates schematically a first embodied form of the invention, operating with direct current and permitting allowance for the latitude.

The apparatus of FIG. 1 has a frame including a housing A including a cover B having a socket D projecting downwardly to serve as a clamping support for the tape F. A gyro rotor case G having a stem H is suspended from the tape F by a clamp J at the upper end of the stem H. The stem H carries a small mirror K. A shaft L is arranged at the lower end of the gyro rotor case and carries a flat armature M of a torque motor at its end. The armature M floats between the poles of a magnetic system N. This magnetic system N is mounted on the bottom C of the housing. A magnetic shield O is provided between gyro G and torque motor M, N.

Opposite the mirror K are a light source P and a photocell Q receiving the light ray reflected from the mirror. The source P, photocell Q and mirror K comprise a pickoff to detect the azimuthal movement of the gyro G. A shaft R is mounted above the cover B. The shaft rotatably supports a sleeve S. At its upper end the sleeve S carries a telescope T and at the lower end a toothed wheel U. An electric motor V has a pinion gear which engages the wheel U. A potentiometer W has a pinion gear on its shaft which engages the teeth of wheel U so that the potentiometer is thus adjusted in response to the rotation of the telescope and the wheel U.

The output signal of the photocell Q is supplied to the armature M of the torque motor through a preamplifier 10, lead network 12 and power amplifier 14 via flexible connections. A voltage v which is a measure of the offset of the tape zero position from north can be picked off at a highly accurate measuring resistor $R_m$ connected in series with the torque motor. This voltage is corrected by a potentiometer P in accordance with the latitude of the point of measurement and is supplied through a filter 16 to the servoamplifier 18 for readjustment of the telescope. The amplifier 18 supplies the motor V to move gear U. The amount of movement is detected by a voltage from potentiometer W. Also, a voltmeter 20 can be utilized for indicating the orientation of the tape zero position of the housing with respect to north in place of the indicator actuated by servoamplifier 18. In such a case, the potentiometer P could be eliminated. The value read at the meter could be corrected by reference to a table.

By way of the servo loop "photoelectric pickoff — torque motor" the period of oscillation of the pendulum through $\alpha$ may be influenced by the selection of the loop gain. The angle $\alpha$ is the angle between north and the gyro spin axis. The angle $\alpha$ is the angle between north and the zero tape position. The angle $\alpha$ is the angle between the zero tape position and the gyro spin axis. By the lead network 12 the oscillation of the pendulum is damped. Moreover, a copper or aluminum disk positioned in the magnetic field of the torque motor may be used for damping.

The filter 16 is effective to maintain an undisturbed adjustment of the telescope independently of external interfering torques acting on the gyro. The frequency characteristic of the filter must be adapted to the respective interference spectrum.

The voltage v supplied to the servo loop is a measure of the offset of the apparatus from north, as will be shown hereinafter. The P(proportional)-performance of the servo loop is adapted to the given conditions.

The apparatus described in conjunction with FIG. 1 utilizes a d.c. torque motor. It is, however, also possible to provide an apparatus with an a.c. torque motor DE, as shown in FIGS. 2 and 3. In FIG. 2 like parts are denominated with the same reference numerals as in FIG. 1. The torque motor comprises a Ferraris armature 22 mounted on a shaft 24 of the gyro rotor casing G. The armature 22 is positioned above a.c.-supplied stator arrangements 26, 28 and 30, 32 each having one control coil and one field coil. The output signals of the photoelectric pickoff after passing the amplifier 10 are applied through potentiometers a, b in the form of currents $i_1$ and $i_2$ to the control coils of the systems 26 to 32 in the manner illustrated in FIG. 3. The current $i_1$ is applied to the control coils of the systems 26 and 28, and the current $i_2$ is applied to the control coils of the systems 30 and 32. Constant alternating currents (the excitation currents) flow through the field coils of the systems 26, 28, 30 and 32 in the manner illustrated in dashed lines.

The current $i_1$ causes a torque about the tape axis of the tape F, while the current $i_2$ causes a torque about an axis perpendicular to the plane of the paper, i.e. in this case to the plane of tape and gyro spin axis, in the illustrated manner. The magnetic fields caused by the current $i_2$ tend to move the armature 22 leftwardly in FIG. 3, as is illustrated by the arrows. By this movement, a damping of the azimuthal oscillations is effected through the coupling of the gyro axes. Thus, the systems 30, 32 replace the lead network 12 in the embodied form according to FIG. 1. The current $i_1$ is indicative of the offset of the gyro from north. As is the situation with the embodiment of FIG. 1, it is converted through a measuring resistor $R_m$ to the voltage $v$ which is then supplied to the servoamplifier 18.

Figure 4:
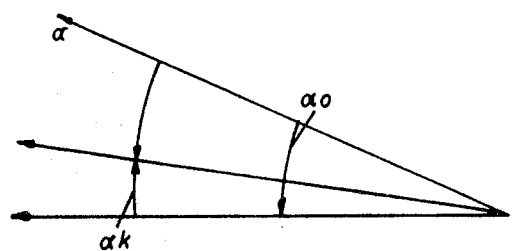
FIG. 4 illustrates the angle designations that are employed.

The operation of the arrangement hereinbefore described will now be explained more fully with reference to FIG. 4 of the drawings.

For the stationary state (after transient oscillation of the apparatus) the following applies $$H\omega_e \cos \phi \sin\alpha \; \alpha + \alpha^\infty \alpha K + M = 0 \qquad (1)$$

$$M = C_\alpha \; \alpha_K = C_M v \qquad (2)$$

$$\alpha = \alpha_o + \alpha_k \qquad (3)$$

In this, $\alpha_K$ is negative and the following terms signify
$H$ = gyro spin angular momentum
$\omega_e$ = rotational speed of the earth
$\phi$ = latitude
$C\alpha$ = spring constant (torque rate) of the tape
$M$ = torque of torque motor
$C_M$ = torque of torque motor per unit of voltage $v$
$v$ = voltage applied to torque motor
$C_\alpha$ = torque of torque motor per unit of angle $\alpha_k$ When starting from an initial rough orientation of the apparatus towards north by means of a prismatic compass, then $\alpha$ and sine $\alpha$ can approximately be equated. Then, $M$ and $\alpha$ can be eliminated and one obtains:

$$H\omega_e \cos \phi \alpha_o + H\omega_e \cos \phi \alpha_k + c_\alpha \; \alpha K + C\alpha \; \alpha_K = 0 \qquad (4)$$

$$|\alpha_o| = (1 \; xc \quad C\alpha + c_\alpha \;\; /H\omega_e \cos\phi)\alpha_K \qquad (5)$$

When expressing $\alpha_K$ by $v$ $$\alpha_K = C_M/C_\alpha \cdot v \qquad (6)$$

and when $$C_\alpha^\infty = xc_\alpha^\infty \qquad (7)$$

then $$|\alpha_o| = H\omega_e \cos \phi + (1+x) \; c_\alpha/xc_\alpha \cdot C_M/H\omega_e \cos \phi \cdot V \qquad (8)$$

Now, the following result is obtained: $\alpha_o$ is proportional to the pickoff voltage $v$. The proportionality factor, however, is also dependent on the latitude $\phi$, and that is in the above expression both in the first factor and also in the second factor in $v$. However, it can be shown that the $\phi$-dependence of the first factor is negligible. For $\phi = 90°$, $H W_c \cos \phi = 0$. When starting from the structurally given condition that the tape torque shall be smaller than the gyroscopic couple $H W_e \cos \phi$ (for $\phi = 0$), then in the most unfavorable case $$c_\alpha = H\omega_e \cos \phi \qquad (9)$$

Figure 5:
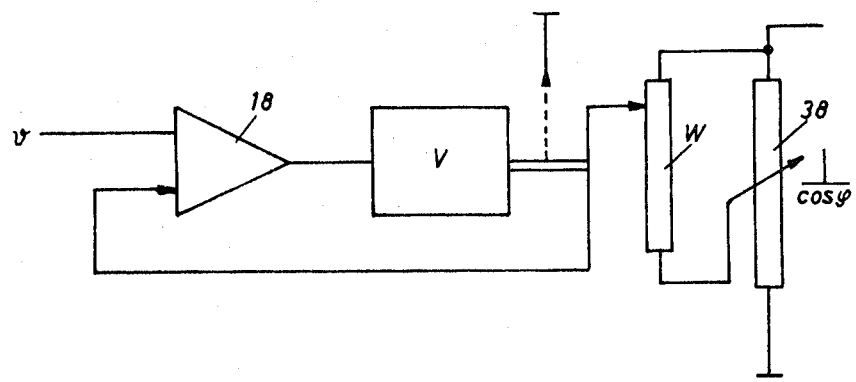
FIG. 5 illustrates another embodiment for allowing for the latitude.

Therewith the first factor of equation (8) becomes $H\omega_e \cos \phi + (1+x)c_\alpha \;\; /x \; c_\alpha \quad = c_\alpha \; + (x+1) \; c_\alpha \;\; /x \; c_\alpha \quad = 1+2/x \qquad (10)$ The error caused when assuming this factor to have a fixed value, is on the order of fractions of an angle minute. Thus, the $\phi$-dependence given by the second factor of equation (8) remains $|\alpha_o| = C_M/H\omega_e \cos \phi \cdot r \qquad (11)$ The proportionality factor between the pickoff voltage $v$ and the angle $\alpha_o$ between the tape zero position and north, through which the telescope must be rotated relative to the tape zero position, is therefore inversely proportional to $\cos \phi$. This change in the proportionality factor with the latitude must be allowed for suitably if the apparatus is used at differing latitudes. One possibility has already been described by way of the example according to FIG. 1. Another solution according to FIG. 5 is possible.

Through the motor V the servoamplifier 18 on the one hand as indicated by the dotted line adjusts the telescope T and on the other hand the potentiometer W. In the embodiment of FIG. 5 the potentiometer W is supplied with a voltage which is picked off at a potentiometer 38 and is adjustable proportionally to $1/\cos\phi$. Also the potentiometer 38 may suitably be nonlinearly wound so that the angle $\phi$ may be directly adjusted thereat.

Alternatively, the scale factor $C_M$ of the torque motor can also be adjusted for the respective latitude by means of a cosine-potentiometer. Also, with a change in the gyro spin rate a change in the instrument calibration could be avoided. To this end, a corresponding increase in the gyro angular momentum would have to be effected with a decreasing cosine (higher latitude), which however would require a relatively great amount of apparatus.

I claim:

1. In a north-seeking gyro pendulum apparatus comprising a housing, a gyro rotor case, a tape connecting the housing and the case and suspending the case from the housing, a pickoff having parts on the housing and the case for generating an electrical signal which is a measure of the azimuthal deflection of the gyro rotor case from the position at which the tape is not torsionally stressed, a torque motor operatively connecting the housing and the case for counteracting the gyro directional torque and connected to the pickoff to be controlled by the pickoff signal, and an indicating device likewise connected to the pickoff and controlled by the pickoff signal for indicating north, the improvement comprising:

an indicating member rotatably mounted, a servomotor connected to the indicating member to rotate the same, a servo-amplifier connected to the servomotor, means connected to the torque motor to derive a signal which is a measure of the current at the torque motor, said means being connected to said servoamplifier to supply said signal thereto, position detection means connected to said indicating member for producing a feedback signal which is a measure of the change in position of the indicating member and connected to said servoamplifier to supply said feedback signal thereto.

2. In an apparatus as set forth in claim 1, the further improvement wherein the indicating member includes a telescope.

3. In an apparatus as set forth in claim 1, the further improvement including a meter connected to said signal derivation means to indicate the magnitude of said derived signal.

4. In an apparatus as set forth in claim 3, the further improvement wherein said derivation means includes a potentiometer for varying the derived signal in response to the cosine of the latitude.

5. In an apparatus as set forth in claim 1, the further improvement wherein said position detecting means includes a potentiometer, and adjustable means connected to said potentiometer to supply a voltage to the potentiometer proportional to the reciprocal of the cosine of the latitude.

6. In an apparatus as set forth in claim 1, the further improvement wherein said derivation means includes a potentiometer for varying the derived signal as a measure of the cosine of the latitude.

7. In an apparatus as set forth in claim 6, the further improvement including an indicating meter, and wherein the potentiometer may be adjusted in accordance with the latitude to produce an adjusted derived signal, said potentiometer being connected to said indicating meter and said servoamplifier to supply said adjusted derived signal thereto.

* * * * *